United States Patent [19]

Hiestand

[11] Patent Number: 4,699,250
[45] Date of Patent: Oct. 13, 1987

[54] LUBRICANT DISPENSER

[75] Inventor: Karl Hiestand, Pfullendorf, Fed. Rep. of Germany

[73] Assignee: SMW Schneider & Weisshaupt GmbH, Fed. Rep. of Germany

[21] Appl. No.: 787,653

[22] Filed: Oct. 16, 1985

[51] Int. Cl.[4] .............................................. F16N 11/00
[52] U.S. Cl. .................................. 184/39; 184/105.1; 184/108
[58] Field of Search ................... 184/39, 39.1, 40, 41, 184/42, 6.4, 105.1, 105.3, 108

[56] References Cited

U.S. PATENT DOCUMENTS

| 458,450 | 8/1891 | Fitzgerald | 184/42 |
| 802,581 | 10/1905 | Morehouse | 184/42 |
| 1,798,213 | 3/1931 | Lyman | 184/105.3 |
| 1,852,058 | 4/1932 | Otis, Jr. | 184/42 |

Primary Examiner—Lenard E. Smith
Attorney, Agent, or Firm—McGlew and Tuttle

[57] ABSTRACT

A lubricant dispenser for a viscous lubricant such as grease, for a chuck body of a power chuck, comprises a container for containing a supply of the viscous lubricant. A delivery plunger, which is in the container and acts on the lubricant, is continually subjected to the pressure of a pressure medium. This forces lubricant from the container into a flexible line which is connected to a pressure intensifier mounted on the chuck body. The pressure intensifier contains a pressure piston which is movable under the influence of an intermittently operating pressure medium, and which carries a displacement piston which can be engaged against a receiving insert of the chuck body to open a valve and close the discharge of lubricant from the pressure intensifier into the chuck body.

14 Claims, 2 Drawing Figures

LUBRICANT DISPENSER

FIELD AND BACKGROUND OF THE INVENTION

The invention relates to a device to feed intermittently viscous lubricants to sliding surfaces, in particular to introduce grease into the body of a power chuck mounted on a machine tool.

In chucks, the lubricant is usually introduced into the jaw ways by means of a lubricant dispenser designed as graase gun and placed over a lubricating nipple installed in the chuck body and communicating with the lubricating slots through a canal so that lubricant is pressed into the lubricating slots, in most cases inan undefined quantity, by the action of a delivery element upon a supply container. The time interval between the various lubricating processes to be performed manually is not defined either, but is up to the discretion of the person servicing the lathe. The result, therefore, is an improper and insufficient, often irregular lubrication of the jaw ways. This, in turn, can lead to damage to the jaws and/or to the chuck body, and thus to production interruptions.

In a power chuck, it is known through DE-OS No. 32 20 585 to assign to each of the jaws a lubricant dispenser, each consisting of a lubricant filled supply container in the form of a lubricant cartridge disposed in the chuck body and of a delivery element designed as a moving piston inserted in said lubricant cartridge, acted upon by pressure medium and acting upon the lubricant. To have the moving piston acted upon in selectable time intervals, there is intalled in a connecting canal a control valve by means of which the connecting canal can be unblocked. In addition, for controlled action upon the face of the control valve, a two-way valve actuatable in settable time intervals is provided. While this design, by means of which the jaw ways are supplied with lubricant in regular time intervals or as a function of a certain operating position automatically and sufficiently has proven out well, it is an expensive one because a multiplicity of recesses and canals has to be machined into the chuck body. Furthermore, installing filled cartridges, each of which must be exchanged individually, into the power chuck is very time-consuming.

Accordingly, it is an object of the invention to create a device which can be readily coupled to a component and by means of which viscous lubricant can be fed to sliding surfaces automatically and intermittently without incurring high production costs, in particular for the component containing the sliding surfaces to be lubricated. There should also be assurance of great operating reliability and that the lubricant transfer is performed in a short period of time without dirt getting into the lubricant or into components conducting or receiving it.

According to the invention, this is achieved by an externally disposed supply container which contains the lubricant and is equipped with a delivery plunger which can constantly be acted upon by pressure medium, and by a lubricating head which is connected to said supply container via a flexible line, is stationarily held a short distance from the chuck body, can be acted upon by pressure medium, can be coupled to a lubricant canal machined into the chuck body for lubricant transfer and is equipped with a pressure intensifier actuatable in selectable time intervals.

It is expedient to equip the supply container with a control device to monitor its fill level, which device may consist, in a simple embodiment, of a differential piston which is connected to the delivery plunger of the supply container so as to be movable within limits and is automatically movable by said delivery plunger in an end position range, and of a sensor such as in the form of a proximity switch actuatable by said differential piston. In addition, the differential piston should be installed in a recess machined into a removable cover of the supply container so as to be movable against the force of a spring, and it should have a piston rod or a similar extension permanently attached to it and going to the outside, on which is mounted a pulse generator such as in the manner of a switching ring which interacts with a proximity switch fixed preferably to the cover of the supply container.

It is further expedient for the delivery plunger to be movably guided on a piston rod which is fastened to the differential piston and projects into the interior of the supply container, and to provide a stop such as in the form of an inserted stop ring on said piston rod in the latter's end area, the delivery plunger interacting with said stop ring to move the differential piston and the switching ring connected to it.

The lubricating head should consist of a pressure piston which is installed in a stationary housing, can be acted upon by pressure medium in time intervals and is movable by the pressure medium in the direction of the chuck body countering the force of one or more return springs, and of a displacement piston movably held in the former, both pistons enclosing a pressure chamber connectable to the supply container and to the lubricant canal machined into the chuck body, and both pistons being movable relative to each other for the intensification of the lubricant pressure.

The pressure chamber should further be preceded by a check valve preferably installed in the pressure piston, and the pressure chamber should be provided with a shutoff valve which is installed in the displacement piston and opens due to the latter making contact with the chuck body or as a function of the lubricant pressure.

To set the amount of lubricant to be introduced into the chuck body it is expedient to provide the pressure piston with a preferably steplessly adjustable stop, by means of which its travel can be limited. This stop may consist of a ring screwed to an extension projecting out of the housing accommodating it. It is further advantageous in this embodiment to dispose the return spring associated with the pressure piston between the housing accommodating the pressure piston and the stop.

To assure always a reliable lubricant transfer, the chuck body should be equipped with a plane bearing surface surrounding the lubricant canal machined into the chuck body to support the displacement piston. In addition, it is expedient to close the lubricant canal of the chuck body towards the outside by a check valve and to dispose the lubricating head behind a cover of the machine tool supporting the power chuck and to fasten it to the machine tool spindle head.

The lubricant dispenser designed in accordance with the invention is not only simple in its construction and, therefore, producible economically, it is also operationally reliable in its function, making it possible, above all, to lubricate all sliding surfaces of a power chuck or of a similar part, simultaneously and sufficiently in a short period of time. The device thus consists of a supply container filled with lubricant and equipped with a delivery piston constantly acted upon by pressure medium and of a lubricating head connected thereto and containing a pressure intensifier which can be actuated in selectable time intervals and can be coupled to a lubricant canal for the transfer of lubricant. Because of this, there is assurance that the lubricant can be introduced into a component such as a power chuck under high pressure and in a short time. Consequently, all lubrication points connected to a preferably central lubricant canal can be supplied with lubricant reliably, simultaneously and adequately so that satisfactory lubrication is assured at all times and operating problems caused by insufficient lubrication are thus avoided, especially also as the amount of lubricant in the supply container is being monitored.

BRIEF DESCRIPTION OF THE DRAWINGS

This embodiment of the lubricant dispenser designed in accordance with the invention is shown in the and explained in detail in the following.

DESCRIPTION OF THE PREFERRED EMBODIMENTS

Figure 1:
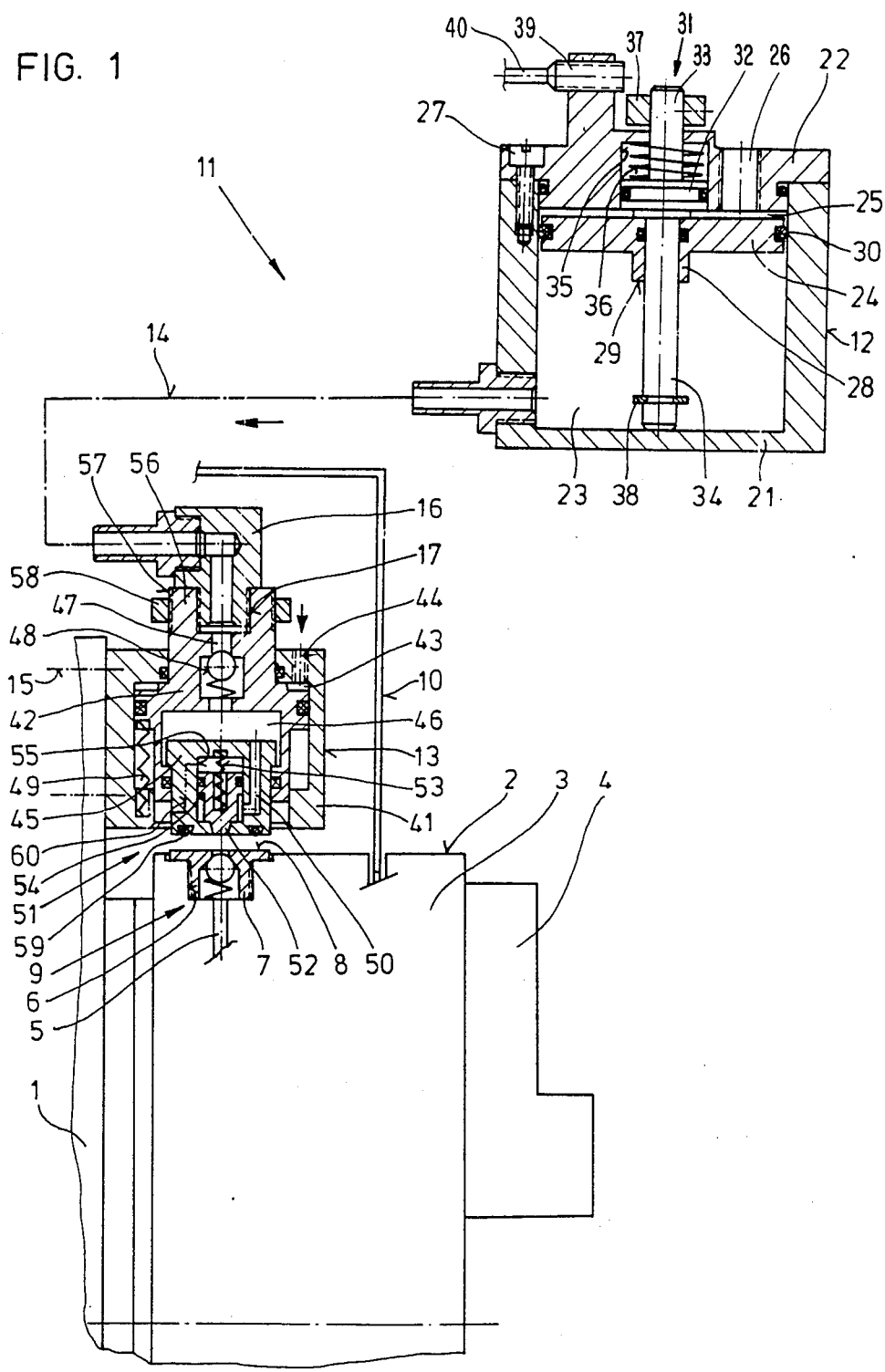
FIG. 1 shows, in section, the lubricant dispenser consisting of a supply container and of a lubricating head associated with the chuck body of a power chuck, and FIG. 2 a modified embodiment of the lubricating head per FIG. 1.

The lubricant dispenser designated 11 shown in FIG. 1 operates to introduce viscous lubricant into a lubricant canal 5 machined into a chuck body 3 of a power chuck 2 with which a machine tool 1 is equipped, so that the sliding surfaces of the chuck jaws 4 guided so as to be radially movable in the chuck body 3, can, always be supplied with lubricant in sufficient quantity and in a short period of time. To close the lubricant canal 5 towards the outside, an insert 7 having a plane bearing surface 8 and a check or shutoff valve 9 is screwed into a tapped hole 6.

The lubricant dispenser 11 consists of an externally disposed supply container 12 and of a lubricating head 13 which is screwed by means of screws 15 to the machine tool 1, e.g. to its spindle head, and which is connected to the supply container 12 via a flexible line 14. The line 14 is connected to the lubricating head 13 by means of an angle 16 provided with an external thread 17.

The supply container 12 consists of a housing 21 closed by a removable cover 22 and of a delivery plunger 24 which is movably installed in a housing cavity 23 filled with lubricant and which, in operation, is constantly acted upon by pressure medium. For this purpose, the pressure medium is conducted into the pressure chamber 25 associated with the delivery plunger 24 via a connector 26 to which a pressure line of a pressure medium source can be connected. Consequently, due to the constant pressurization of the delivery piston 24, it is assured that the viscous lubricant is slowly replenished into the lubricating head 13 through the line or hose 14, after the lubricating head 13 has dispensed some lubricant.

In order to monitor to what level the supply container 12 is filled, it is equipped with a control device 31 by means of which a signal is generated as soon as only a certain settable amount of lubricant is left. To accomplish this, there is installed in a recess 35 in the cover 22 fastened to the housing 21 by screws 27, a differential piston 32 which can likewise be acted upon by the pressure medium introduced into the pressure chamber 25 and which has a piston rod 33 going to the outside and supporting a pulse generator in the form of a switching ring 37. The cover 22 supports, as sensor of the pulse generator, a proximity switch 39 which interacts with the adjustable switching ring 37 and is connected to an indicator or the like via a line 40.

The differential piston 32 is acted upon by a compression spring 36, moving it into the position shown if the pressure prevailing in the pressure chamber 25 is insufficient to overcome the force of the spring 36. In this operating position, the proximity switch emits no signal, thus making it possible to monitor the pressure.

Molded to the differential piston 32 is further a piston rod 34 which projects into the interior 23 of the housing 21 and on which the delivery plunger 24, provided with a seal 30, is movably guided. To the end area of the piston rod 34 is fastened to a stop ring 38 which interacts with a stop surface 29 formed by a collar 28 on the delivery plunger 24.

When pressure medium is introduced into the pressure chamber 25, both the delivery plunger 24 and the differential piston 32 are acted upon. The delivery plunger 24 thus acts upon the lubricant contained in the interior 23, pressurizing it constantly, while the differential piston 32 is being pushed upwardly against the force of the spring 36. A signal associated with this operating position is generated in the proximity switch 39 by means of the switching ring 37, thus indicating that the supply container 12 is in operation. But if the amount of lubricant drops below a predetermined level settable by the position of the stop ring 38 due to lubricant transfer to the power churck 2, the differential piston 32 is moved downwardly because it is taken along due to the stop surface 29 provided on the delivery plunger 24 making contact with the stop ring 28. This causes the signal of the proximity switch 39 to be altered because the switching ring 37 is also being moved, thereby indicating that lubricant must be replenished in the supply container 12. Accordingly, the control device 31 can monitor whether the supply container 12 is functional and whether it still contains an adequate amount of lubricant.

The lubricating head 13 is composed of a pressure piston 42 movably installed in a housing 41 mounted to the machine tool 1, and of a displacement piston 45 held in the pressure piston 42. Both pistons enclose a pressure chamber 46 and are movable relative to each other. The pressure piston 42 and the displacement piston 45 thus form a pressure intensifier through which the pressure exerted on the lubricant supplied through the flexible line 14 can be increased considerably for introduction into the power chuck 2.

To accomplish this, a pressure chamber 43 into which an appropriately high-pressure medium can be introduced, is associated with the pressure piston 42. And the pressure chamber 46 is preceded by a check valve 48 by means of which a canal 47 machined into the pressure piston 42 and connected to the flexible line 14 via the angle 16, is blocked when the pressure in the pressure chamber 46 arises. The pressure chamber 46 can be connected to the lubricant canal 5 machined into the body 3 of the power chuck 2, via a canal 50 which is machined into the displacement piston 45 and is equipped with a shutoff valve 51.

When pressure medium is supplied through connection 44 to the pressure chamber 43 so as to act upon the pressure piston 42, the latter is moved in the direction of the chuck body 3, countering the force of return springs 49 supported by the housing 41. Since the pressure chamber 46 is filled with lubricant, the displacement piston 45 supported by the pressure piston 42 is automatically taken along, its face making contact with the plane bearing surface 8 of the insert 7. Since the displacement piston 45 in this operating position supports itself against the chuck body 3 and cannot move any further, the volume of the pressure chamber 46 is reduced if the pressure piston 42 continues to move. This causes the pressure prevailing therein to increase, and the pressure acting upon the surface 54 of shutoff valve 51 provided on the valve body 52, causes the valve body 52 to move upwardly against the force of a spring 53 so that the shutoff valve 51 is opened and lubricant is pressed out of the canal 51 under high pressure quickly into the lubricant canal 5 of the chuck body 3. Due to the seal 59 inserted in the displacement piston 45, it is impossible for lubricant to get to the outside and/or dirt to get into the lubricant canal 5. In addition, the recess 5 in which the valve body 52 and the spring 53 are installed, is vented through opening 55 and a line 60.

When the pressure chamber 43, to be connected intermittently to a pressure medium source in accordance with the intended lubrication intervals, is vented, the pressure piston 42 and with it also the displacement piston 45 are returned into the starting position shown, by the force of the return springs 49. Therefore, the power chuck 2 can be taken into operation again immediately after the conclusion of a lubrication.

In order to be able to set the amount of lubricant to be fed to the power chuck 2, there is disposed on an extension 56 molded on the pressure piston 42, to which extension the angle 16 is screwed also, on an external thread 57 a ring 58 which forms a stop interacting with the housing 41. As soon as the ring 58 contacts the housing 41 the pressure piston 42 can travel no further, and the lubricant still in the pressure chamber 46 is no longer pressed out. In this manner, and especially since the ring 58 is height adjustable, the amount of lubricant to be delivered can be changed readily and can be adapted to the respective operating conditions.

Figure 2:
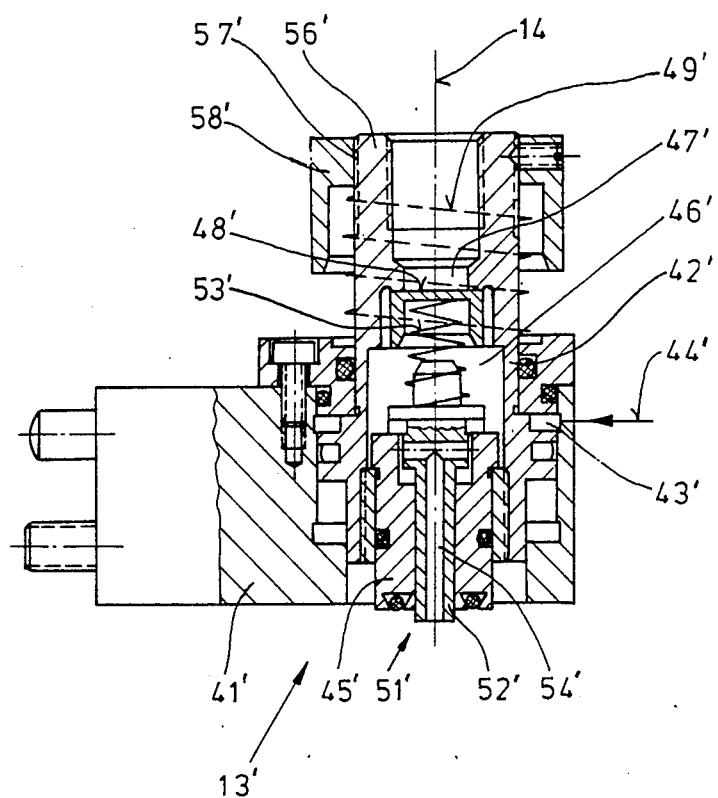

The lubricating head 13' shown in FIG. 2 is designed similarly to the lubricating head 13 per FIG. 1. Again, a pressure piston 42' with which is associated a pressure chamber 43' provided with a pressure medium connector 44' is movably installed in a housing 41', and a displacement piston 45' enclosing a pressure chamber 46' is held in the pressure piston 42'. The pressure chamber 46' is likewise preceded by a shutoff valve 48' by means of which the feeder canal 47' can be blocked in case of a pressure increase, and succeeded by a shutoff valve 51' which is of different design, however.

The shutoff valve 51' here consists of a valve body 52' which projects beyond the displacement piston 45' and is machined into a canal 54'. If the displacement piston 45' makes contact with the chuck body 3, the shutoff valve 51' is automatically opened against the force of a spring 53' common to both shutoff valves 48' and 51'.

In this embodiment, the return spring 49' acting upon the pressure piston 42' is installed between the housing 41' and a stop ring 58' adjustably screwed to a thread 57' provided on an extension 56' of the pressure piston 42'. If the pressure chamber 43' is vented, both the pressure piston 42' and the displacement piston 45' of the lubricating head 13', which acts in the same manner as the lubricating head 13 per FIG. 1 disposed behind a cover 10, are thus returned automatically into their starting position shown.

I claim:

1. A device for the intermittent feeding of viscous lubricant to the sliding surfaces of a power chuck having a chuck body mounted on a machine tool, comprising, a supply container for containing the lubricant spaced away from the chuck body, said supply container having a constant pressure connection for receiving a constant pressure of pressure medium, and a lubricant discharge opening, a delivery plunger mounted for movement in said container between said constant pressure connection and said discharge opening, said delivery piston being exposed to the constant pressure of pressure medium to force lubricant from said container through said discharge opening, a lubricating head fixed to the chuck body at a short distance from the chuck body, a flexible line connected between said discharge opening of said container and lubricating head to supply lubricant from said container to said lubricating head, the chuck body having a lubricant canal therein at a location to receive lubricant from said lubricating head, pressure intensifier means mounted in said lubricating head for actuation at selected time intervals to operatively engage said lubricant canal to discharge lubricant from said lubricating head to said lubricant channel, and said lubricating head having an intermittent pressure connection for the supply of intermittent pressure medium to said lubricating head to intermittently activate said pressure intensifier means for the discharge of lubricant from said lubricating head to said lubricant channel.

2. A device according to claim 1 including control means operatively connected to said container for monitoring a level of lubricant in said container.

3. A device according to claim 2 wherein said control means comprises a differential piston operatively connected to said plunger and being movably mounted to said container, a proximity switch mounted to said container and cooperating with said differential piston for sensing a position of said differential piston, said differential piston being connected to said plunger so that with said plunger in an end position thereof in said container, which is indicative of a low level of lubricant in said container, the movement of said differential piston is constrained which constraint is determinable by said proximity switch to indicate the low level of lubricant in said container.

4. A device according to claim 3 wherein said container includes a removable cover having a recess therein, the differential piston being mounted for movement in said recess, and a first spring mounted in said recess and engaged between said removable cover and said differential piston for urging said differential piston toward the plunger.

5. A device according to claim 4 including a piston rod connected to the differential piston and extending out of said container, a switching ring connected to said differential piston rod and positioned to cooperate with said proximity switch for indicating a position of said differential piston, said proximity switch being mounted to said removable cover.

6. A device according to claim 5 including a further piston rod connected to said differential piston and extending into said container, said delivery plunger being mounted for sliding movement on said further piston rod, a stop ring connected to said piston rod and engageable by said delivery plunger when a low level of lubricant is in the container, for constraining movement of said delivery plunger.

7. A device according to claim 1 or 2 or 3 or 4 or 5 or 6 wherein said lubricating head has an interior space with which said intermittent pressure connection communicates, a pressure piston movably mounted in said space of said lubricating head and on one side of said intermittent pressure connection for being moved intermittently in said lubricating head by intermittent pressure medium entering said space through said intermittent pressure connection, a return spring operatively engaged between said lubricating head and said pressure piston for biasing said pressure piston twoard said intermittent pressure connection, and a displacement piston mounted for movement to said return piston and defining a pressure chamber with said return piston for containing lubricant from said supply container, said pressure and displacement pistons being removable with respect to each other for intensifying pressure in said pressure chamber, said displacement piston carrying valve means which are openable to discharge lubricant from said pressure chamber into said lubricant canal.

8. A device according to claim 7 wherein said pressure piston includes a pressure piston canal extending therethrough and communicating said flexible line with said pressure chamber, and a pressure valve in said pressure piston canal for permitting flow of lubricant only from said flexible line into said pressure chamber.

9. A device according to claim 8 wherein said valve means of said displacement piston comprises a shutoff valve having a valve member which is engageable against the chuck body for opening the shutoff valve when said pressure and displacement pistons have been moved by the intermittent pressure medium toward the chuck body.

10. A device according to claim 9 including a further stop ring operatively connected to said pressure piston for adjusting, in a stepless fashion, a maximum stroke of said pressure piston which corresponds to a selected amount of lubricant to be discharged from said pressure chamber to said lubricant canal.

11. A device according to claim 10 wherein said pressure piston includes an extension, said further stop ring, being threaded to said extension, said intermittent head having a housing, said further stop ring being engageable against said housing to set the maximum stroke of said pressure piston.

12. A device according to claim 11 wherein said return spring is mounted between said housing and said further stop ring.

13. A device according to claim 11 including a plain bearing surface on said chuck body surrounding an inlet of said lubricant canal, said displacement piston being engageable against said plain bearing surface for activating said valve means.

14. A device according to claim 11 including a further check valve in said lubricant canal for permitting only the entry of lubricant into the chuck body.

* * * * *